United States Patent Office 3,197,320
Patented July 27, 1965

3,197,320
COATING COMPOSITIONS OF DIHYDRO-
PYRAN METHANOL ESTERS
Peter J. Graham, Gladwyne, Pa., and Heinz F. Reinhardt,
Claymont, Del., assignors to E. I. du Pont de Nemours
and Company, Wilmington, Del., a corporation of
Delaware
No Drawing. Filed Aug. 28, 1962, Ser. No. 220,027
40 Claims. (Cl. 106—287)

This application is a continuation-in-part of our copending application Serial No. 99,047, filed March 29, 1961, and now abandoned.

This invention relates to both a new class of air drying compositions suitable as surface coatings and to the process for making coated articles from them.

It has been found unexpectedly that some esters of dihydropyran methanol in combination with siccative metals yield compositions that will air dry rapidly at room temperatures to make useful surface coatings. These esters have unique viscosity properties that permit making high solids (up to 100%) compositions coatable in a single operation to films up to 20 mils thick. Many show the rapid top-dry properties which minimize dust accumulation in the coating and are uniquely free of the oxygen inhibition phenomena in thin films (0.5 mil). These esters can be used to prepare clear as well as pigmented coating compositions and further can be used in combination with other film forming materials or even to replace some or all of the solvents conventionally used in liquid coating compositions. Such coating compositions can be applied by dipping, spraying, knifing or brushing and some can be extruded or even milled or calendered. Further, such materials surprisingly can be used in casting and potting compositions and are particularly useful for room temperature casting thick sheets of clear polymer for glazing and structural uses.

The esters of 3,4-dihydropyran-2-methanol are preferred, though the esters of the obviously related position isomers derived from acrolein and methacrolein dimers, such as 5,6-dihydropyran-3-methanol, can also be used. Generally, these position isomers react much less rapidly than do the 3,4-dihydropyran-2-methyl esters.

The new air-drying coating compositions of this invention comprise (a) an ester of at least one organic carboxylic acid and at least one alcohol of the class consisting of 3,4-dihydropyran-2-methanol and 2,5-dimethyl-3,4-dihydropyran-2-methanol and (b) a siccative metal compound which is soluble in said ester.

Such esters have the following structural formula:

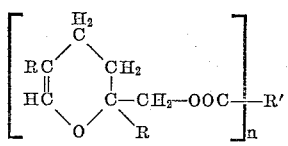

in which R is hydrogen or methyl, R' is the residue of a carboxylic acid and $n$ has the value of 1 when the compound is a monoester, 2 when it is a diester, etc.

Such esters can be prepared from the respective dihydropyran-2-methanols by conventional transesterification procedures using a suitable catalyst, preferably in the presence of a polymerization inhibitor such as hydroquinone. Any of a large number of simple lower alkyl, e.g. methyl or ethyl, esters of organic acids are suitable sources of the acid moiety in such transesterification, including alkane mono- and dicarboxylic acids and particularly those having 2 to 10 carbon atoms, unsaturated aliphatic mono- and dicarboxylic acids and particularly those having 3 to 9 carbon atoms, unsaturated oil acids derived from drying oils and aryl and alkaryl mono- and polycarboxylic acids. Examples of these include acetic, propionic, butyric, suberic, palmitic, stearic, oxalic, glutaric, adipic, azelaic, sebacic, tricarballylic, acrylic, alpha-chloroacrylic, methacrylic, crotonic, cinnami, fumari, maleic, itaconic, sorbic, oleic, linoleic, ricinoleic, mixed acids from drying oils such as linseed oil acid, tung oil acid, dehydrated castor oil acid, benzoic, toluic, orthophthalic, isophthalic, terephthalic and pyromellitic acids. The esters of unsaturated aliphatic acids and particularly the alpha, beta-unsaturated acids, acrylic, methacrylic, fumaric, maleic and itaconic are particularly preferred in the compositions of this invention. However other acids and particularly the longer carbon chain acids, though they dry somewhat less rapidly, provide a means in blends for making tougher more flexible coatings.

The required siccative metal compounds are the well known metallic driers of the organic coating art, i.e. the naphthenate, linoleate, resinate, tallate, octoate (2-ethyl hexoate) or other soaps or salts of siccative metals such as cobalt, lead, iron, manganese, calcium, barium, zinc, chromium, vanadium, etc. A preferred siccative metal is cobalt. The proportion of siccative metal compound is usually 0.001% to 5% of metal (in the compound) based on the total weight of above defined ester (plus any other air drying film former) in the composition. The preferred proportion is 0.01% to 1.0% of metal on the same basis.

In addition to the required esters and siccative metal compounds, the compositions of this invention can include substances which are commonly used in organic coatings. These include dyes and pigments of all colors, plasticizers, catalysts, hardeners, anti-skinning agents, inhibitors and flow control agents.

While the preferred compositions of this invention do not necessarily require additional liquid materials to be coatable, small quantities, up to about 40%, of volatile solvents such as toluene, xylene, ethyl acetate and methyl ethyl ketone may be desirable to adjust spraying, brushing or other application properties. Other hydrocarbons, esters or ketones can be used, as well as ethers, glycol esters and glycol ether esters. Liquids which may react with the pyranyl ring such as alkanols, phenols, carboxylic acids, amines, acid anhydrides are preferably avoided or used only in small amounts.

Articles of wood, metal, plastic, primed wood or metals, anti-corrosion treated metals, etc. represent substrates suitable for coating with the compositions of this invention.

The process for making the coated articles of this invention consists essentially of first applying a composition containing at least one dihydropyran-2-methanol ester along with a siccative metal compound to the surface of the article and then exposing the applied composition to gaseous oxygen such as air.

Because of the unique drying properties and high solids content possessed by many of these compositions, films of considerable thickness can be prepared readily and practicably in a single operation. Films up to 20 mils thickness are particularly useful and will air dry at room temperatures to a dust-free stage in several minutes to several hours' time. Depending upon the specific composition, and its thickness as applied, through-dry of the films and maximum hardness will be developed from several hours to several days later. More importantly, they dry rapidly in thin films, e.g., 0.5 mil or less without showing oxygen inhibition phenomena. The dihydropyran-2-methanol esters further are valuable coating materials because their drying properties are quite insensitive to the inhibiting effects of certain pigments such as toluidine reds and carbon blacks and of certain film formers such as nitrocellulose which may be used in earlier coatings on the same article.

The rate of dry and some of the resulting film properties can be enhanced by baking these coatings in air at elevated temperatures for short periods, e.g. 10–60 minutes at 150°–250° F.

The actual rate of drying of the compositions of this invention depends, as in other coating compositions, on the film thickness, amount of drier present, temperature and the species of film former.

The dihydropyran-2-methanol esters, such as acrylate, methacrylate, fumarate, itaconate, etc., are usable by themselves as the sole film former. However, they are also used as blends with each other or with polymeric materials or drying oils, for example, polyacrylates and polymethacrylates, vinyl chloride copolymers, polyvinyl butyrals, melamine/formaldehyde and urea/formaldehyde resins, linseed oil, vinyl dioxolane and vinyl dioxane esters, alkyd resins, etc. The polyacrylates and polymethacrylates used in the above blends are considered to include various molecular weight syrups and resinous polyacrylate and polymethacrylate esters of the pyranyl methanols as well as of the alkyl and cycloalkyl alcohols well known in the art.

Further, such dihydropyran-2-methanol esters generally can be both blended with or, where they are esters of $\alpha,\beta$-unsaturated acids, copolymerized to various molecular weights with up to about 90% of other unsaturated monomers, such as styrene, arcylonitrile, ethylene, esters of acrylic, methacrylic, maleic, fumaric, itaconic, sorbic, chloracrylic and other $\alpha,\beta$-unsaturated acids, vinyl esters, such as the acetate, butyrate and stearate, and lower alkyl vinyl ethers, to form materials useful as air drying coating and casting compositions. Mixtures with monomers having boiling points above 100° C. are preferred because of their relatively low rate of evaporation and minimum loss during polymerization in the open. Mixtures with the higher boiling acrylates and acrylates including glycidyl, cyclohexyl, propyl and higher alkyl esters are particularly preferred.

Though the compositions of this invention are directed primarily to thin films and coatings (less than 20 mils thick), certain compositions are particularly well suited as quick-setting, tack-free, low-temperature casting and potting materials. Preferred compositions contain the dihydropyran-methanol esters of acrylic, methacrylic, chloracrylic and ethacrylic acids. Particularly preferred are the acrylic or methacrylic esters in combination with about 0.01 to 1.0% of a siccative metal (especially cobalt or manganese as a soluble organic compound) and about 0.01% to 1.0% of a soluble organic-free radical-generating compound, such as:

Benzoyl peroxide    t-Butyl hydroperoxide
Cyclohexanone peroxide    Methylethylketone peroxide
Cumene hydroperoxide    Dimethylhexane dihydroperoxide
t-Butyl perbenzoate    Azo-bis-isobutyronitrile In contrast to prior art compositions not containing dihydropyranmethanol esters, the casting compositions of this invention can be cured rapidly at room temperature to a tack-free, solid state and are suited for making strong, clear, glazing sheets or for potting electrical units. Some compositions have both low exotherms and rapid setup and are particularly useful for embedding biological materials. Plasticized and/or slower curing compositions further are prepared by blending with the preferred esters one or more other ethylenic monomers as hereinbefore listed, e.g. styrene, vinyl stearate or 2-ethylhexyl acrylate. Where autoclaving or pressurizing equipment is available, even relatively low boiling monomers can be economically admixed in the casting compositions, e.g. ethyl vinyl ether B.P. 35° C. or acrylonitrile B.P. 79° C.

EXAMPLE I

A three-necked flask fitted with a thermometer, nitrogen inlet, addition funnel, reflux condenser and magnetic stirrer was charged with 57 parts of 3,4-dihydropyran-2-methanol, 150 parts of methyl methacrylate monomer, 1.5 parts of sodium methoxide and 0.5 part of hydroquinone. The contents were blanketed with nitrogen and heated to reflux. A mixture of methanol and methyl methacrylate was then distilled off slowly. Fresh methyl methacrylate was added from time to time to the flask to keep the liquid level constant. At the end of four hours' refluxing, pot temperature 113° C., the product was cooled to room temperature, filtered and then fractionated in a distillation column, collecting the portion boiling between 54° and 56° C. at 0.15 mm. pressure. This material was identified as the methacrylate ester of 3,4-dihydropyran-2-methanol.

To 5 parts of the above methacrylate was added 0.002 part of cobalt as an acetone solution of cobalt butyl phthalate containing 0.010 gram cobalt ion per milliliter. The solution was mixed and cast on glass and on anticorrosion treated metal panels with a 0.0033" gap doctor knife. The panels were leaned against a support and exposed to air at room temperature to test drying rate. The coatings began to dry immediately in air and were "dust-free" after several hours. After drying overnight, a 0.020" thick coating was tack-free and showed a Knoop Hardness Number at 25° C. of 18.2. Thinner coatings dried to a hardness of 23.1 in a similar time. Coatings had good adhesion to the treated metal and were clear, glossy and tough. Exposure of these clear coatings over metal for 6 months outdoors showed essentially no change.

EXAMPLE II

Using the equipment of Example I, 456 parts of 3,4-dihydropyran-2-methanol, 1000 parts of methyl acrylate stabilized with 0.01% methyl hydroquinone were charged, blanketed with nitrogen and heated to reflux. Over a period of six hours, 8 parts of sodium methoxide were added in small portions and the low boiling fraction (72–76° C.) about 1000 parts, consisting of methanol and residual reactants were removed. At the end of this time the contents of the pot were fractionated under vacuum and the cut boiling at 67° C. and 0.3 mm. Hg was separated. Analysis established this as being the acrylate ester of the above substituted methanol.

Analysis showed—Calc.: C, 64.27; H, 7.19. Found: C, 64.04; H, 7.68.

A coating composition was prepared from 10 parts of the above acrylate and 0.005 part of cobalt as an acetone solution of cobalt butyl phthalate. The product was cast on a glass panel using a 0.0033" doctor knife, exposed to air and found to dry hard to the fingernail overnight. Analogous results were obtained with other cobalt compounds such as the benzoate, naphthenate or octoate.

EXAMPLE III

Using equipment similar to that of Example I, 228 parts of 3,4-dihydropyran-2-methanol, 344 parts of diethyl fumarate and 1.0 part of hydroquinone were placed in the reaction flask, blanketed with nitrogen and 5 grams of sodium methoxide added slowly over a period of 2½ hours. The ethanol formed was slowly distilled off and after 3 hours, the contents of the flask to which had been added some white oil were distilled over at 152–153° C. at 2.2 mm. Hg. The index of refraction was $N_{24}$ 1.4801. The fumarate diester of the above methanol was identified as the product and chemical analysis showed:

Calc.: C, 62.32; H, 6.54. Found: C, 62.24; H, 7.14.

Twenty parts of the above fumarate diester was mixed with 0.1 part of cobalt as a xylene solution of cobalt butyl phthalate, and 0.05 part of a 5% silicone oil (Dow Corning 550) solution in toluene, and cast on panels of glass and nitrocellulose primer-coated aluminum at several thicknesses. These were air dried at 77° F., 50% relative humidity and inspected periodically. After six hours, the coatings were tack-free. After one week they had a Tukon hardness of about 12. They showed excellent resistance to attack by xylene and methyl ethyl ketone. The rate of dry over the nitrocellulose primer was particularly notable since it was equivalent to that in the absence of nitrocellulose.

EXAMPLE IV

In a three-necked flask equipped with stirrer thermometer, nitrogen inlet, dropping bottle and Vigreux column were placed 158 parts of dimethyl itaconate, 228 parts of freshly distilled 3,4-dihydropyran-2-methanol with 0.5 part of hydroquinone and 250 parts of toluene. The charge was flushed with nitrogen and heated to 112° C. (just short of reflux). Then 13.0 parts of tetraisopropyl titanate catalyst as a 20% xylene solution were added slowly from a dropping bottle over a period of six hours, maintaining reflux. The toluene methanol azeotrope (64° C.) was slowly distilled off and periodically an equivalent amount of fresh toluene was replaced in the flask. At the end of this time when the theoretical amount of methanol had been removed (48.7 parts), the charge was cooled, diluted with an equal volume of hexane and washed successively with equal volumes each of 5% NaOH in saturated NaCl solution, repeated and followed by a 10% NaHCO₃ solution, and finally with one portion of distilled water. The product was separated, dried over MgSO₄, filtered and then redistilled at low pressure to remove residual solvents. The itaconate diester of 3,4-dihydropyran-2-methanol was identified as the product.

Five parts of the above itaconate diester, 0.05 part of a 5% solution of a silicone oil (Dow Corning 550) in toluene and 0.24 part of cobalt as cobalt butyl phthalate in xylene were mixed and cast 2.5 mils thick on glass panels. Upon air drying at 77° F. and 50% RH, the coatings became tack-free in six hours and were hard dry within 22 hours, with a Tukon hardness of 10.2. Analogous coatings containing no cobalt remained wet even after 334 hours exposure. Coatings containing cobalt were force dried in air at 150° F. and were hard within one hour.

EXAMPLE V

The procedure of Example IV was repeated substituting a molar equivalent amount of dimethyl o-phthalate for the dimethyl itaconate, with sodium methoxide as the catalyst. Air drying compositions containing 0.5% cobalt were prepared and cast from the phthalate diester of 3,4-dihydropyran-2-methanol.

EXAMPLE VI

The Tischenko dismutation ester of 3,4-dihydro-2H-2-formylpyran, as prepared for example in U.S. 2,768,213, Example II, and having the structural formula:

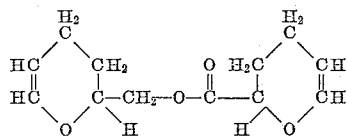

was mixed with 0.5% of a 20% solution of cobalt butyl phthalate in acetone, coated on glass panels and allowed to air dry overnight. It was found to yield a clear tack-free film.

EXAMPLE VII

An ester interchange similar to that of Example IV was carried out using 72.1 parts dimethyl fumarate, 0.5 part hydroquinone and 180 parts toluene charged as described, flushed with nitrogen and heated to reflux (about 120° C.). At this point 149.3 parts of 2,5-dimethyl-3,4-dihydropyran-2-methanol were added, heating continued to reflux and then 8.5 parts of a 20% tetraisopropyl titanate catalyst in toluene were added in two portions over a period of 2½ hours along with 80 additional parts of toluene.

As reflux was continued, 28.2 parts of methanol (theoretical 32.04) as the toluene-methanol azeotrope were removed, 100 parts of a white mineral oil added and the whole vacuum distilled to remove first the residual reactants and solvent. Finally at 0.3 mm. Hg and 170° C. the dihydropyran-2-methanol diester was distilled over and collected.

A composition containing this ester with 0.05% cobalt (as cobalt butyl phthalate) was prepared and cast on glass panels. The coating was found to be hard dry in about 72 hours at room temperature.

EXAMPLE VIII

Portions of the coating composition of Example III were modified separately with dispersions of titanium dioxide, toluidine red and iron oxide pigments previously prepared in polymethyl methacrylate/toluene solution. Said compositions were prepared with a ratio of 1/9, 1/25, and 1/7 pigment/pyran ester respectively and cast on anticorrosion treated steel. Air drying 8 hours at 70° F. provided tack-free glossy films without evidence of inhibition.

Other examples of compositions prepared from the 3,4-dihydropyran-2-methanol esters within the scope and concept of this invention will be obvious to those skilled in the coating art, for example, use of, as before enlisted, other metal driers than cobalt, various solvents and conventional coating resins alone or in blends. Dihydropyran-2-methanol esters made from acids other than those specifically shown herein can be used and are readily obtainable by substitution of, for example, the methyl or ethyl ester of the desired acid on an equivalent molar basis of available carboxyl group. Such substitution can be alone or in blends with other transesterifiable esters for all or part of the starting ester of the example.

EXAMPLE IX

A blend of 5 parts polyester (hereinafter described), 5 parts 3,4-dihydropyran-2-methyl methacrylate, 0.12 part of an 8% cobalt butyl phthalate solution in xylene and 0.05 part of a 60% solution of methyl ethyl ketone peroxide in dimethyl phthalate was thoroughly mixed and cast into a sheet mold ½″ thick. After about 4–5 hours at room temperature, a colorless, clear, glossy sheet was obtained which hardens with air contact in about 24 hours and is useful as a glazing panel.

A thin film of the above casting composition was spread on a metal panel and baked for 20 minutes at 100° C. A clear, hard, glossy adherent film results.

The polyester in the above was prepared by charging 91.4 parts of 2,2′-trimethylene-bis-4(4-hydroxybutyl)-1,3-dioxolane (0.275 mol) in a three-necked container fitted for stirring and reflux and heated to 80° C. under a blanket of nitrogen. Then 17.2 parts maleic anhydride (0.175 mol), 5.5 parts phthalic anhydride (0.0375 mol) and 5.5 parts adipic acid (0.037 mol) were added and heating carried slowly up to about 180° C. under vacuum over a period of about 6 hours. The polyester was then cooled to room temperature.

Similar results were obtained with other polyesters containing active unsaturated groups, such as polyallyl glyceryl phthalates and conventional alkyd resins.

EXAMPLE X

Example IX was repeated, replacing the 3,4-dihydropyran-2-methyl methacrylate with an equal amount of 3,4-dihydropyran-2-methyl fumarate. Cast on metal and baked for 20 minutes at 100° C., the composition yielded a soft, tack-free, clear film.

EXAMPLE XI

A casting composition was prepared by mixing 30 parts of freshly distilled 3,4-dihydropyran-2-methyl methacrylate, 1.2 parts of an 8% cobalt butyl phthalate xylene solution and 0.12 part of a 60% solution of methyl ethyl ketone peroxide in dimethyl phthalate and pouring the mixture into a shallow mold. In about 20 minutes the mixture became highly viscous and in 45 minutes a cured, transparent, glossy, insoluble sheet.

In contrast, the same composition without the added peroxide required about 12–15 hours to cure at room temperature.

Repeats of Example XI were made using equal amounts of cobalt or manganese naphthenates, ruthenium butyl phthalate or iron naphthenate to replace the cobalt butyl phthalate. Essentially equivalent results were obtained in 1 hour, 5 hours, 16 and 24 hours, respectively.

EXAMPLE XII

A mixture of 15 parts of 3,4-dihydropyran-2-methyl methacrylate, 10 parts of glycidyl methacrylate, 1.2 parts of 8% cobalt butyl phthalate solution and 0.12 part of a 60% methyl ethyl ketone peroxide solution was prepared and poured in a shallow mold. After about 1 hour, a transparent, hard, slightly greenish casting resulted.

A repeat of the above composition using an equal amount of distilled isobutyl methacrylate to replace the glycidyl methacrylate resulted in a hard, clear, green, tack-free casting in about 1½ hours.

EXAMPLE XIII

A mixture of 15 parts of 3,4-dihydropyran-2-methyl methacrylate (PMA), 10 parts of acrylonitrile, 0.25 part of benzoyl peroxide and 0.025 part of N,N-diisopropanol-p-toluene (dissolved in 0.5 part of PMA) was prepared and quickly poured in a mold. In about 10–12 minutes a yellow, transparent, flexible casting resulted.

EXAMPLE XIV

A mixture of 15 parts PMA, 10 parts ethyl acrylate, 1 part of an 8% cobalt butyl phthalate solution and 0.25 part benzoyl peroxide was prepared and placed in a shallow mold. In about 16 hours at room temperature, a hard, transparent, greenish casting was obtained.

EXAMPLE XV

A mixture of 12 parts of PMA with 12 parts of methyl methacrylate, 0.7 part of an 8% cobalt solution and 0.12 part t-butyl hydroperoxide was prepared and placed in a shallow mold. In about 4½ hours a greenish, transparent, hard casting resulted.

EXAMPLE XVI

Other useful casting compositions were made by repeating Example XI, replacing the methyl ethyl ketone peroxide therein with one of the following initiators:

| | Hours to hard casting |
|---|---|
| 0.3 part cyclohexanone peroxide | 1 |
| 0.15 part t-butyl perbenzoate | 2 |
| 0.3 part azo-bis-isobutyronitrile | 7 |
| 0.3 part 2,5-dimethylhexane-2,5-dihydroperoxide | 2 |

EXAMPLE XVII

Mixtures of 10 parts of 3,4-dihydropyran-2-methyl fumarate, 0.5 part of the 8% cobalt solution and 1 part respectively of each of the following four initiators were prepared and coated as three mil thick film on bonderited metal panels:

| | Parts |
|---|---|
| Benzoyl peroxide | 0.1 |
| Methyl ethyl ketone peroxide | 0.05 |
| Azo-bis-isobutyronitrile | 0.1 |
| t-Butyl hydroperoxide | 0.05 |

After air drying at room temperature for about 4–6 hours, clear, glossy, hard, adherent coatings were obtained.

EXAMPLE XVIII

A copolymer was prepared by charging a reaction vessel with:

| | Parts |
|---|---|
| 3,4-dihydropyranol methacrylate | 18.2 |
| Distilled styrene | 10.4 |
| Toluene | 45.0 |
| Benzoyl peroxide | 0.29 |

The vessel was provided with reflux condenser and stirrer, flushed with nitrogen and sealed. The contents were heated to about 120–125° C. for 1½ hours until the reaction was complete. A glass-clear viscous polymer solution was formed which when mixed with about 0.02% cobalt drier and cast as a film on a glass panel, dried tack-free within several hours and became insoluble in several days. A similarly prepared glass panel baked 30 minutes at 140° C. yielded a hard, clear insoluble film. Similar results were obtained from films prepared as above in which 3,4-dihydropyranmethyl methacrylate monomer was blended with the copolymer of Example XVIII.

EXAMPLE XIX

Example XVIII was repeated replacing the styrene by 10.0 parts of distilled ethyl acrylate. A reaction temperature of about 118° C. was maintained for about 1½ hours to produce a copolymer of ethyl acrylate and dihydropyranmethyl methacrylate.

Bonderited steel panels coated with the above polymer solution containing 0.02% soluble cobalt on the polymer, air dried in a few hours to a clear, tack-free, insoluble adherent coating. Baking 30 minutes at 140° C. further enhanced the insolubility.

The above copolymer solution was pigmented by ball milling 15 parts of $TiO_2$ pigment with 100 parts of polymer solution. When a small amount of soluble cobalt was added and the dispersion was coated on a metal panel and allowed to air-dry for 4 hours, a white glossy, tack-free film resulted. As noted before, small amounts of organic peroxide, in addition to cobalt, speeded up the rate of air-dry.

Similar results were obtained with a copolymer solution prepared by repeating Example XVIII, replacing the styrene with 10 parts of methyl methacrylate and yielding a methyl methacrylate/3,4-dihydropyran-2-methyl methacrylate copolymer. This copolymer in turn blended with monomeric materials, such as styrene, glycidyl methacrylate or 3,4-dihydropyran-2-methyl acrylate formed air-drying films when cast with added cobalt driers.

EXAMPLE XX

A 65/35 copolymer of methyl methacrylate/ethyl acrylate (192 parts of a 52% solution in xylene) was transesterified with 3,4-dihydropyran-2-methanol (30 parts) in the presence of 0.3 part of lithium hydride dissolved in 8 parts of methyl alcohol. The ingredients were placed in a three-necked flask fitted with a still-head, take-off, stirrer and blanketed with nitrogen. The contents were then heated to about 115°–142° C. over a period of several hours and the liberated methyl and ethyl alcohols distilled out. A brown viscous solution remained of a mixed copolymer of methyl, ethyl and 3,4-dihydropyran-2-methyl acrylate/methacrylate. When mixed with a small amount of soluble cobalt drier and coated on a steel panel, the film air-dried in 1–3 hours to an insoluble, clear, hard, glossy, colorless coating having high adhesion and toughness.

In a similar manner 192 parts of a 60/40 styrene/ethyl acrylate copolymer was transesterified with 34.1 parts of 3,4-dihydropyran-2-methanol and 0.3 part lithium hydride to yield a brown viscous solution of an ethylenic copolymer having both pendant phenyl and dihydropyran-2-methoxy carbonyl groups. The solution of this copolymer with added drier and coated 2.2 mils thick on a glass panel air-dried at room temperature, was tack-free in several hours, and became highly insoluble after about 2 weeks. A similar coated panel baked for 10 minutes at 100° C. showed high film adhesion, and toughness to bump and bend tests, and was insoluble in toluene and tetrahydrofuran.

EXAMPLE XXI

A paint suitable for outdoor use on wood siding, window frames, trim and the like was prepared as follows:

Part 1

A thorough dispersion of the following composition was prepared in a quart ball mill or sand mill by procedures well known in the art:

| | Parts |
|---|---|
| TiO$_2$ pigment | 3000 |
| Dispersant (Baker Castor Oil Co. MPA) | 30 |
| Xylene | 525 |
| Pentaerythritol/soya alkyd resin-60% solids in naphtha | 835 |

Part 2

A paint was prepared by blending:

| | Parts |
|---|---|
| Dispersion of Part 1 | 132 |
| 3,4-dihydropyran-2-methyl fumarate | 50 |
| Pentaerythritol/soya alkyd resin | 25 |
| Dibutyl itaconate | 20 |
| 4% cobalt butyl phthalate solution in xylene | 2.5 |

The paint applied to wooden and glass panels with a 5.6 mil doctor blade air dried in about 7 hours at room temperature to a glossy white finish. The films have good adhesion, water and sunlight resistance.

EXAMPLE XXII

A paint suitable for coating of galvanized steel was prepared by dispersing the following ingredients in a ball mill:

| | Parts |
|---|---|
| Zinc dust | 198 |
| Zinc oxide | 54 |
| Magnesium silicate | 45 |
| Organo-treated bentonite ("Bentone 34") | 3 |
| 3,4-dihydropyran-2-methyl linoleate | 80 |
| 3,4-dihydropyran-2-methyl fumarate | 30 |
| Toluene | 30 |
| n-Butyraldoxime | 0.023 |
| Dispersant (Baker Castor Oil MPA) | 1 |
| Cobalt butyl phthalate | 0.5 |

After milling to a smooth dispersion, 0.12 part of additional cobalt drier was added and the paint brushed out on solvent-cleaned, galvanized steel panels and air dried firm and tack-free in about 36 hours. After several days, a tough, hard, highly adherent coating resulted with excellent resistance to water and salt spray.

The dihydropyranmethanol esters are particularly desirable as vehicles, for example as shown here, for they have also excellent storage stability in the presence of zinc dust, producing no gassing and no gellation after one month.

The dihydropyranmethyl fumarate used above is shown in Example III. The linoleate ester was prepared as follows:

Using equipment similar to Example I, 3000 parts (10 mols) of methyl linoleate were transesterified by heating with 1350 parts (11.6 mols) of 3,4-dihydropyran-2-methanol using 40 parts of basic lead acetate as a catalyst. At the end of about 6 hours' heating (temperature 140–202° C.), the equipment was evacuated and the excess dihydropyranmethanol was removed by fractionation up to about 200° C. at 2.5 mm. Hg. At about 210° C. at 2.5 mm. Hg the dihydropyranmethyl linoleate began to distill and was collected up to about 242° C. at 4.5 mm. Hg, with the bulk distilling at about 236° C. at 3.8 mm. Hg. The linoleate ester was a clear, slightly oily fluid.

EXAMPLE XXIII

An air-curing emulsion copolymer of a 3,4-dihydropyranmethanol ester was prepared as follows:

A stirred reaction vessel was charged with 0.2 part of K$_2$S$_2$O$_5$ and 3.3 parts of wetting agent ("Dupanol" WAG 30%) dissolved in 200 parts of distilled water and heated to 100° C. for a few minutes. The water was then cooled to about 65° C. and 0.57 part of K$_2$S$_2$O$_8$ added with a blend of the following monomers:

| | Parts |
|---|---|
| 3,4-dihydropyran-2-methyl fumarate | 15 |
| Methyl methacrylate | 17 |
| 2-ethylhexyl acrylate | 66 |
| Methacrylic acid | 2 |

The reaction was stirred at about 60° C. for ½ hour, then heated to 65° C. for about 3¼ hours. A stable emulsion copolymer of the above four monomers resulted.

Twenty parts of the above emulsion copolymer and about 0.3 part of a 4% cobalt butyl phthalate solution in xylene are mixed and then coated on a steel panel and baked 15 minutes at 100° C. A clear, insoluble, hard, tough coating resulted. Replacement of some or all of the monomeric fumarate ester in Example XXIII with a dihydropyran methyl itaconate, yielded a polymer emulsion with analogous air drying properties.

EXAMPLE XXIV

A polymer of cyclohexyl methacrylate was prepared and dissolved in cyclohexyl methacrylate monomer to yield a syrup of about 5 poise viscosity. To 10 parts of this syrup were added 10 parts of 3,4-dihydropyran-2-methyl methacrylate and 0.15 part of 4% cobalt butyl phthalate solution. The mixture was then coated on a glass panel and was found to air-dry to a clear, hard, tack-free film in 6 to 10 hours.

The cyclohexyl methacrylate syrup was replaced by a solution of a 3,4-dihydropyran-2-methyl methacrylate polymer in toluene and Example XXIV above repeated. Essentially equivalent results were obtained.

EXAMPLE XXV

Part 1

A vessel was charged with the following ingredients, flushed with nitrogen and sealed:

| | Parts |
|---|---|
| Xylene | 150 |
| 3,4-dihydropyranmethyl methacrylate | 25 |
| Methyl methacrylate | 35 |
| Ethyl acrylate | 40 |
| Azo-bis-isobutyronitrile | 1 |
| Dodecylmercaptan | 0.5 |

The contents were then heated for about 18 hours at 85° C. to provide a solution of a terpolymer of the above three monomers.

Part 2

A pebble mill was charged with the following ingredients and milled for 12 hours to produce a fine dispersion:

| | Parts |
|---|---|
| Terpolymer solution of Part 1 | 184 |
| Xylene | 123 |
| Rutile titanium dioxide | 593 |

Part 3

A paint was then prepared of 286 parts of the terpolymer solution of Part 1, with 76 parts of the dispersion of Part 2, and about 1.0 part of 4% cobalt butyl phthalate solution (about 0.04% Co$^{++}$ on resin solids) and coated 1.5 mils thick upon bonderited steel panels. (a) Coatings air-dried in about 4 hours to tack-free, glossy, white films which after several weeks of outdoor exposure were insolubilized. (b) Upon baking for 30 minutes at 250° F., a white, glossy, adherent, tough bump-resistant enamel coating resulted.

The type coatings exemplified by Example XXV are useful for automotive finishes for they, at low cobalt content and low bake, remain soluble so that factory touch-up can be done readily and yet the finishes become insoluble after several weeks. By including in the above formulation an accelerator or free radical initiator such as the organic peroxides, tertiary amines, and other nitrogen compounds known in the art as vinyl polymerization accelerators, well crosslinked coatings can be obtained. For example, the above formulation is repeated using only 0.5 part of the 4% cobalt solution and adding 0.6 part of benzoyl peroxide. Upon coating and baking 30 minutes at 250° F., a harder and more dirt and scratch resistant coating than before results, having excellent resistance to aromatic gasolines, toluenes, etc.

EXAMPLE XXVI

In a stainless steel rocker bomb were charged 100 parts toluene, 67 parts of methyl methacrylate monomer, 14 parts of 3,4-dihydropyran-2-methyl methacrylate and 0.5 part azobisvaleronitrile (QY639). The bomb was sealed, flushed with nitrogen and pressured to 800 atm. with ethylene and held at 100° C. for 60 minutes with agitation. At the end of this time, the bomb was cooled below 75° C. and the contents removed. A toluene solution of a terpolymer of about 75% methyl methacrylate, 15% dihydropyranmethyl methacrylate and 10% ethylene resulted.

The above solution was mixed with about 0.02% cobalt (as cobalt butyl phthalate) on the polymer solids and coated to yield about 1.3 mils dry film thickness on a primed steel panel and baked for 30 minutes at 250° F. A glossy clear film resulted having a Tukon hardness of about 14.5 and showing no crazing or softening in contact with a drop of toluene.

Another portion of the above coating solution was pigmented with titanium dioxide to a resin/pigment ratio of about 100/20, and coated on a primed phosphate treated (Bonderite 100) steel panel. The film was tack free on drying several hours at room temperature and is resistant to toluene after 4 to 5 days.

EXAMPLE XXVII

A bis(5,6-dihydro-2H-pyran-3 methyl) itaconate was prepared as follows.

In the equipment of Example I was placed:

23.7 parts 67% dimethyl itaconate solution in toluene
22.8 parts 5,6-dihydro-2H-pyran-3-methanol (prepared as in U.S. 2,514,156)
12 parts toluene
0.25 part of a lead octoate solution in toluene (24% lead)

The flask was flushed with nitrogen and heating commenced. At a flask temperature of about 130° C. evolved methanol and toluene started to distill and was removed over a period of about four hours. Several times during the course of this period additional toluene was added drop wise (about 60 parts total) to aid in removal of the methanol. Near the end of the reaction when nearly all toluene had been distilled off (170° C. flask) a stream of nitrogen was used to flush the residual toluene from the flask and the contents were cooled to room temperature. A viscous straw colored product remained.

Ten parts of the above prepared bis(5,6-dihydropyran-3-methyl) itaconate was mixed with 0.03 part of a 4% cobalt solution in toluene (as cobalt butyl phthalate) and then doctor knifed 3.5 mils thick on a glass panel and allowed to air dry at 70° F. for about 16 hours. A clear, hard, slightly brittle coating results having excellent adhesion to the glass. It is unaffected by a drop of toluene.

We claim:

1. An air drying coating composition consisting essentially of (a) an ester of at least one acid selected from the group consisting of alkane mono- and dicarboxylic acids, unsaturated aliphatic mono- and dicarboxylic acids, unsaturated oil acids derived from drying oils, aryl mono- and polycarboxylic acids and alkaryl mono- and polycarboxylic acids, and at least one alcohol selected from the class consisting of 3,4-dihydropyran-2-methanol and 2,5-dimethyl-3,4-dihydropyran-2-methanol; (b) a siccative metal compound which is soluble in said ester.

2. A coating composition of claim 1 in which said alcohol is 3,4-dihydropyran-2-methanol.

3. A coating composition of claim 1 in which said alcohol is 2,5-dimethyl-3,4-dihydropyran-2-methanol.

4. A coating composition of claim 1 in which said acid is an unsaturated aliphatic monocaboxylic acid.

5. A coating composition of claim 4 in which the acid is linseed oil acids.

6. A coating composition of claim 4 in which the acid is tung oil acids.

7. A coating composition of claim 4 in which the acid is dehydrated castor oil acids.

8. A coating composition of claim 4 in which said acid is an alpha,beta-unsaturated monocarboxylic acid.

9. A coating composition of claim 8 in which the acid is acrylic acid.

10. A coating composition of claim 8 in which the acid is methacrylic acid.

11. A coating composition of claim 8 in which the acid is sorbic acid.

12. A coating composition of claim 1 in which said acid is a saturated aliphatic polycarboxylic acid.

13. A coating composition of claim 12 in which the acid is adipic acid.

14. A coating composition of claim 12 in which the acid is oxalic acid.

15. A coating composition of claim 12 in which the acid is sebacic acid.

16. A coating composition of claim 12 in which the acid is tricarballylic acid.

17. A coating composition of claim 1 in which said acid is a saturated aliphatic monocarboxylic acid.

18. A coating composition of claim 117 in which the acid is acetic acid.

19. A coating composition of claim 17 in which the acid is 2-ethyl hexoic acid.

20. A coating composition of claim 17 in which the acid is palmitic acid.

21. A coating composition of claim 1 in which said acid is an ethylenically unsaturated aliphatic dicarboxylic acid.

22. A coating composition of claim 21 in which the acid is fumaric acid.

23. A coating composition of claim 21 in which the acid is itaconic acid.

24. A coating composition of claim 21 in which the acid is maleic acid.

25. A coating composition of claim 1 in which said acid is an aryl carboxylic acid.

26. A coating composition of claim 25 in which the acid is benzoic acid.

27. A coating composition of claim 25 in which the acid is orthophthalic acid.

28. A coating composition of claim 25 in which the acid is pyromellitic acid.

29. A coating composition of claim 1 in which the siccative metal is cobalt.

30. A composition of claim 1 which contains dissolved therein about 0.01 to 1.0 weight percent of an organic peroxygen compound capable of generating free radicals.

31. A composition of claim 1 which contains in addition to the said ester at least one $\alpha,\beta$-ethylenically unsaturated polymerizable monomer having a boiling point above about 100° C.

32. A composition of claim 1 in which the acid is an addition polymer of at least one $\alpha,\beta$-unsaturated ethylenic carboxylic compound having, per ethylenic unsaturation, from one to two pendant carboxyl radicals.

33. A composition of claim 1 which contains in admixture at least one addition polymer of at least one α,β-ethylenically unsaturated compound.

34. A composition of claim 1 which contains in addition at least one condensation polymer of a polycarboxylic acid with a polyfunctional compound selected from the class consisting of diamines and glycols.

35. A composition of claim 32 in which said addition polymer is a copolymer of (a) said α,β-unsaturated ethylenic compound bearing pendant dihydropyran-2-methanol ester groups and (b) at least one other α,β-unsaturated monomeric compound.

36. A composition consisting essentially of 3,4-dihydropyran-2-methyl methacrylate, about 0.01 to 1.0 weight percent of a soluble organic cobalt compound and about 0.01 to 0.5 percent of methyl ethyl ketone peroxide.

37. A casting composition which consists essentially of (a) an ester of at least one acid selected from the group consisting of alkane mono- and dicarboxylic acids, unsaturated aliphatic mono- and dicarboxylic acids, unsaturated oil acids derived from drying oils, aryl mono- and polycarboxylic acids and alkaryl mono- and polycarboxylic acids, and at least one alcohol selected from the class of 3,4-dihydropyran-2-methanol and 2,5-dimethyl-3,4-dihydropyran-2-methanol (b) an α,β-ethylenically unsaturated monomer (c) a siccative metal compound soluble in said ester and (d) a peroxygen compound capable of generating free radicals.

38. An article bearing a coating of a composition according to claim 1.

39. A composition of claim 1 which contains dissolved therein about 0.01 to 1.0 weight percent of azobisisobutyronitrile.

40. A casting composition which consists essentially of
(a) an ester of at least one acid selected from the group consisting of alkane mono- and dicarboxylic acids, unsaturated aliphatic mono- and dicarboxylic acids, unsaturated oil acids derived from drying oils, aryl mono- and polycarboxylic acids and alkaryl mono- and polycarboxylic acids, and at least one alcohol selected from the class of 3,4-dihydropyran 2-methanol and 2,5-dimethyl-4,3,4-dihydropyran-2-methanol,
(b) an α,β-ethylenically unsaturated monomer,
(c) a siccative metal compound soluble in said ester, and
(d) azobisisobutyronitrile.

References Cited by the Examiner

UNITED STATES PATENTS

| 2,480,347 | 8/49 | Wittcoff | 260—345.8 |
| 2,514,168 | 7/50 | Smith et al. | 260—345.8 |
| 2,537,291 | 1/51 | Smith | 260—345.8 |
| 2,905,585 | 10/59 | Koenecke | 106—287 |

FOREIGN PATENTS 534,639  12/46  Canada.

OTHER REFERENCES

J. Org. Chem., Lal et al., vol. 20, No. 8, August 1955, pages 1030–1033.

MORRIS LIEBMAN, *Primary Examiner.*

LESLIE H. GASTON, *Examiner.*